Figure 1:
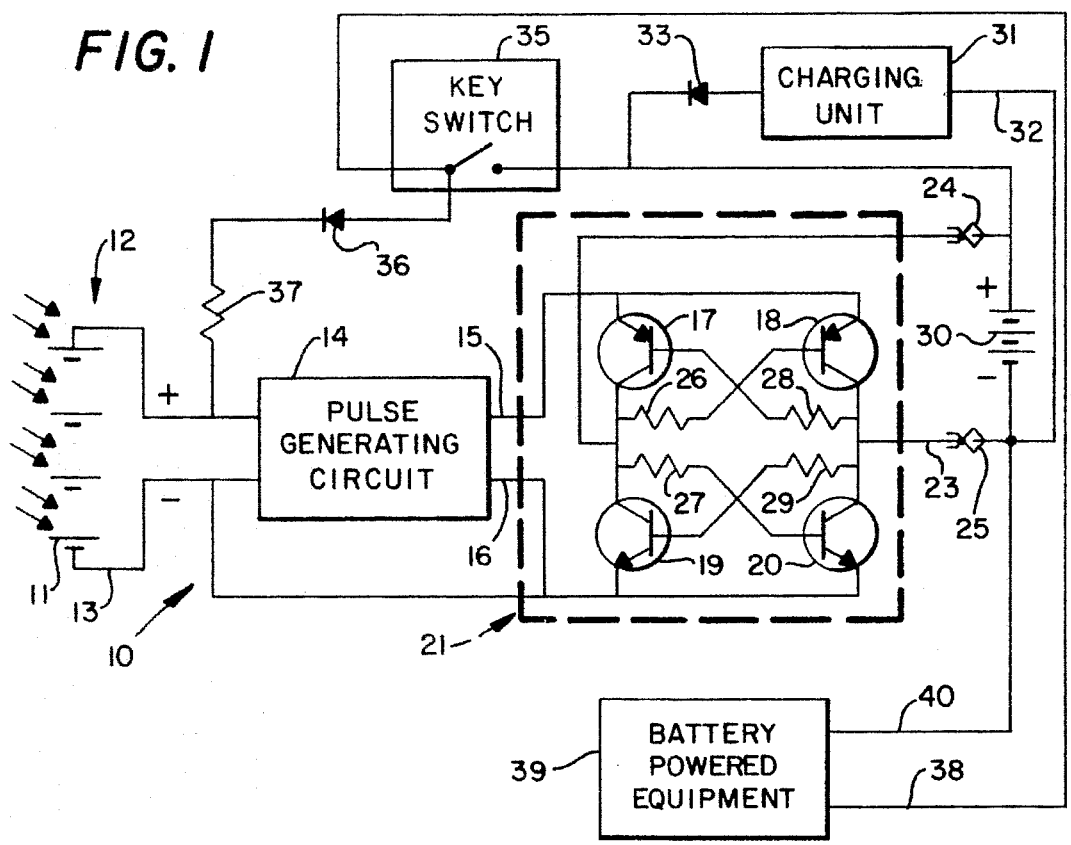

United States Patent [19]
Gali

[11] Patent Number: 5,541,495
[45] Date of Patent: Jul. 30, 1996

[54] BATTERY POLARITY CONNECTION ADAPTION SOLID STATE SWITCH

[76] Inventor: Carl E. Gali, 6414 Faircove Cir., Garland, Tex. 75043

[21] Appl. No.: 916,182

[22] Filed: Jul. 17, 1992

[51] Int. Cl.$^6$ .............................. H02J 7/00; H01M 2/10
[52] U.S. Cl. ..................... 320/26; 320/25; 429/1
[58] Field of Search ................... 429/1; 320/25, 320/26

[56] References Cited

U.S. PATENT DOCUMENTS

| | | | |
|---|---|---|---|
| 2,117,692 | 5/1938 | Atkins | 429/1 |
| 4,608,528 | 8/1986 | Stillwell | 429/1 |
| 4,693,948 | 9/1987 | McEwan | 429/1 |
| 5,075,182 | 12/1991 | Weber | 429/1 |
| 5,191,507 | 3/1993 | Saito | 320/26 X |

FOREIGN PATENT DOCUMENTS 8108285  4/1981  France.

*Primary Examiner*—David B. Springer
*Attorney, Agent, or Firm*—Warren H. Kintzinger

[57] ABSTRACT

A bi-polar solid state battery switch is provided enabling the DC pulse output of battery reclaimer and charger circuits to be connected to a battery without regard to battery terminal polarity. The battery polarity bias itself determines bias to an conductive state of one of two sets of transistors through the respective resistors, This makes the battery connection conform to the same polarity as the output DC of the reclaimer and charger.

15 Claims, 4 Drawing Sheets

BATTERY POLARITY CONNECTION ADAPTION SOLID STATE SWITCH

This invention relates in general to battery chargers and conditioners, and more particularly, to battery reclaiming, maintaining and low current voltage charger for liquid electrolyte and jell electrolyte supplied batteries, and to battery polarity connection adaption with battery reclaimer and charger systems.

A characteristic of liquid electrolyte type batteries particularly lead acid batteries is that chemical compound deposits slowly build up on the plates to partially or entirely cover, and displace the normal plate surfaces. Low current recharging is inadequate in that it cannot, as such, sufficiently remove such deposits that with the passage of time crystallize and choke the battery plates by interfering blockage of electrolyte movement. Through the years many people have tried to dislodge these deposits by "Fast Charging", an approach that generally ultimately overheats and warps the lead plates in a lead acid battery. When this occurs a battery may still appear to have taken a charge and even the electrolyte may check as being correct but the battery does not hold the charge as the plates are effectively shorted. The transfer of electrons between metal (lead) electrodes and ions in a solution, or jell, is not instantaneous. Thus, with a series of sufficiently fast rise time voltage pulses to voltage levels above the theoretical cell voltage the close to instantaneous voltage is distributed over the entire lead plate surfaces and the lead sulfation that is built up on the plate surfaces will be released, either going back into the solution or broken up. Batteries using other electrolytes also face reclaiming, maintenance and charging problems that need to be successfully addressed. A further problem to be faced is that output connections to a battery many times are inadvertently reversed making a system inoperative and/or damaging components.

It is, therefore, a principal object of this invention to provide a combination reclaiming, maintaining and charging circuit for batteries with polarity connection being adaptable to either polarity.

Another object is to provide such a combination reclaiming, maintaining and charging circuit capable of removing current blocking deposits from battery plates regardless of polarity.

A further object is to prevent overheating and warpage of plates in a battery when charging efforts are made to dislodge deposits from battery plates, and to prevent explosion of batteries with overheating.

Still another object is to significantly extend the useful service life and reliability of batteries at reasonable cost without reverse polarity connection induced damage.

Features of the invention useful in accomplishing the above objects include, in a DC powered battery combination reclaimer and charger, a DC powered battery reclaiming and charging circuit has a high frequency section (a bystable multi-vibrator, relaxation blocking bystable multi-vibrator or an oscillator inverter circuit) DC powered and output coupled by a close coupled RF transformer to the battery connected output section with a battery polarity connection adaption solid state switch. The transformer has a secondary winding producing a current—voltage full wave output sharply defined through a two diode rectifying circuit to a multi-frequency 10 KHz to 100 KHz pulse output. The sharp pulses develops RF outputs that are in the 2–10 megahertz frequency range with specific frequencies equal to natural resonant frequencies of the specific electrolytes used respective batteries. The resulting high frequency output that is enveloped in each pulse structure, is capable of reclaiming, maintaining and charging batteries that possess a liquid electrolyte or jell electrolyte and the output is beneficial to dry cell batteries as well. One embodiment includes a switch key that when closed a battery of a vehicle system and/or a charging unit is are) a power source supplying power input to the pulse generating circuit supplemental to or in place of a DC power source. Thus, at times the battery itself provides the power to the pulse generator for the rejuvenating action with the battery.

Specific embodiments representing what are presently regarded as the best modes of carrying out the invention are illustrated in the accompanying drawings.

Figure 2:
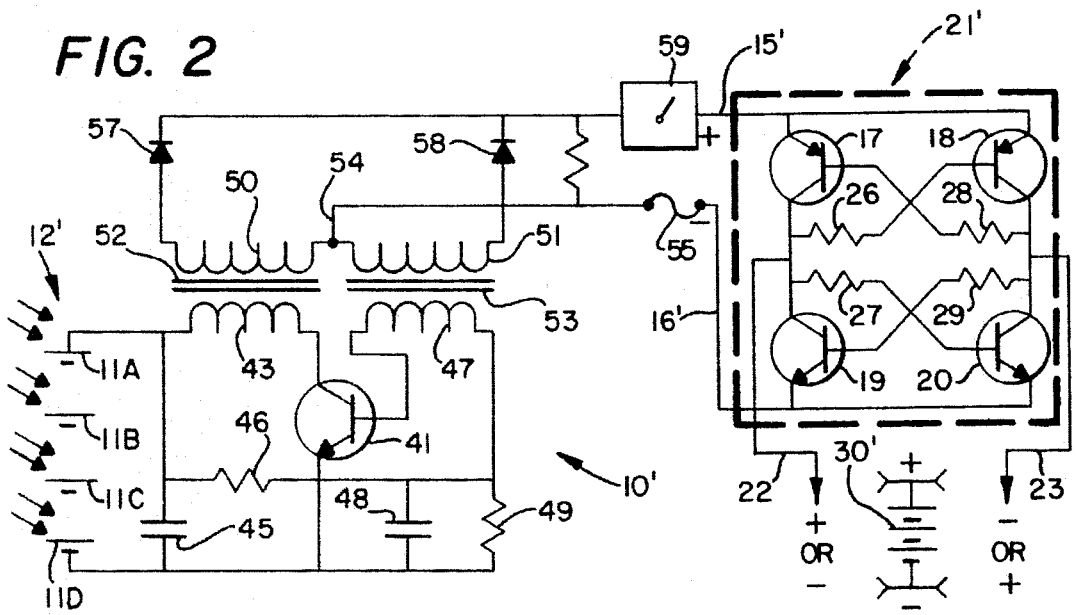
Figure 3:
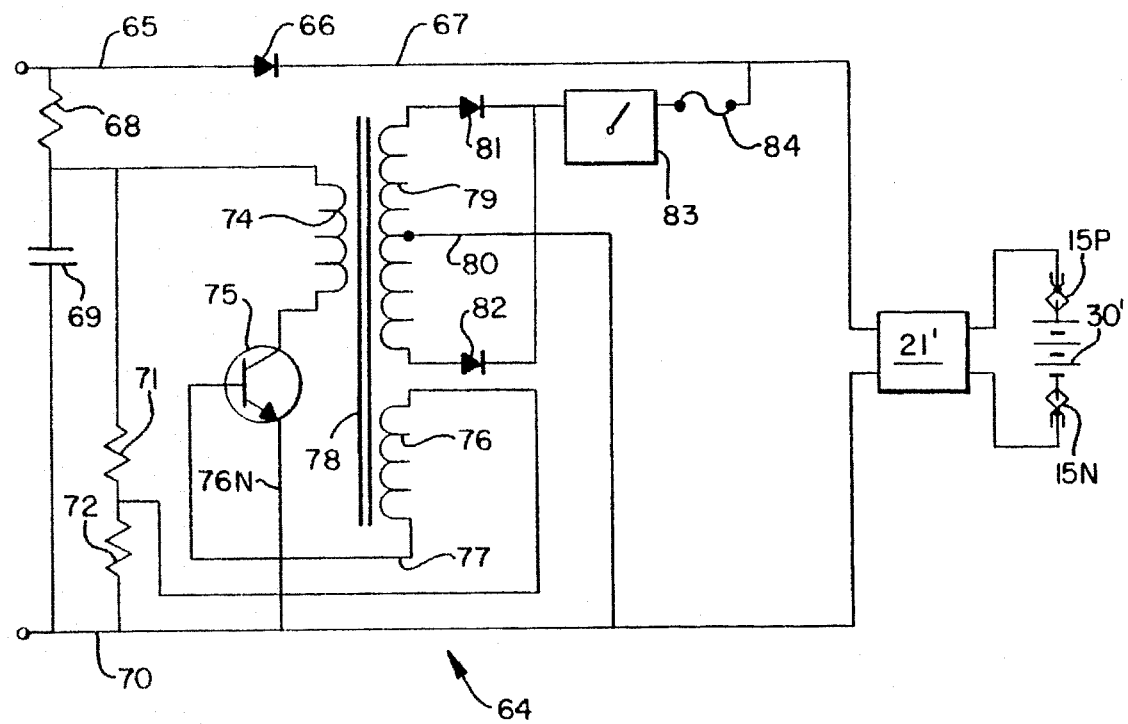
Figure 4:
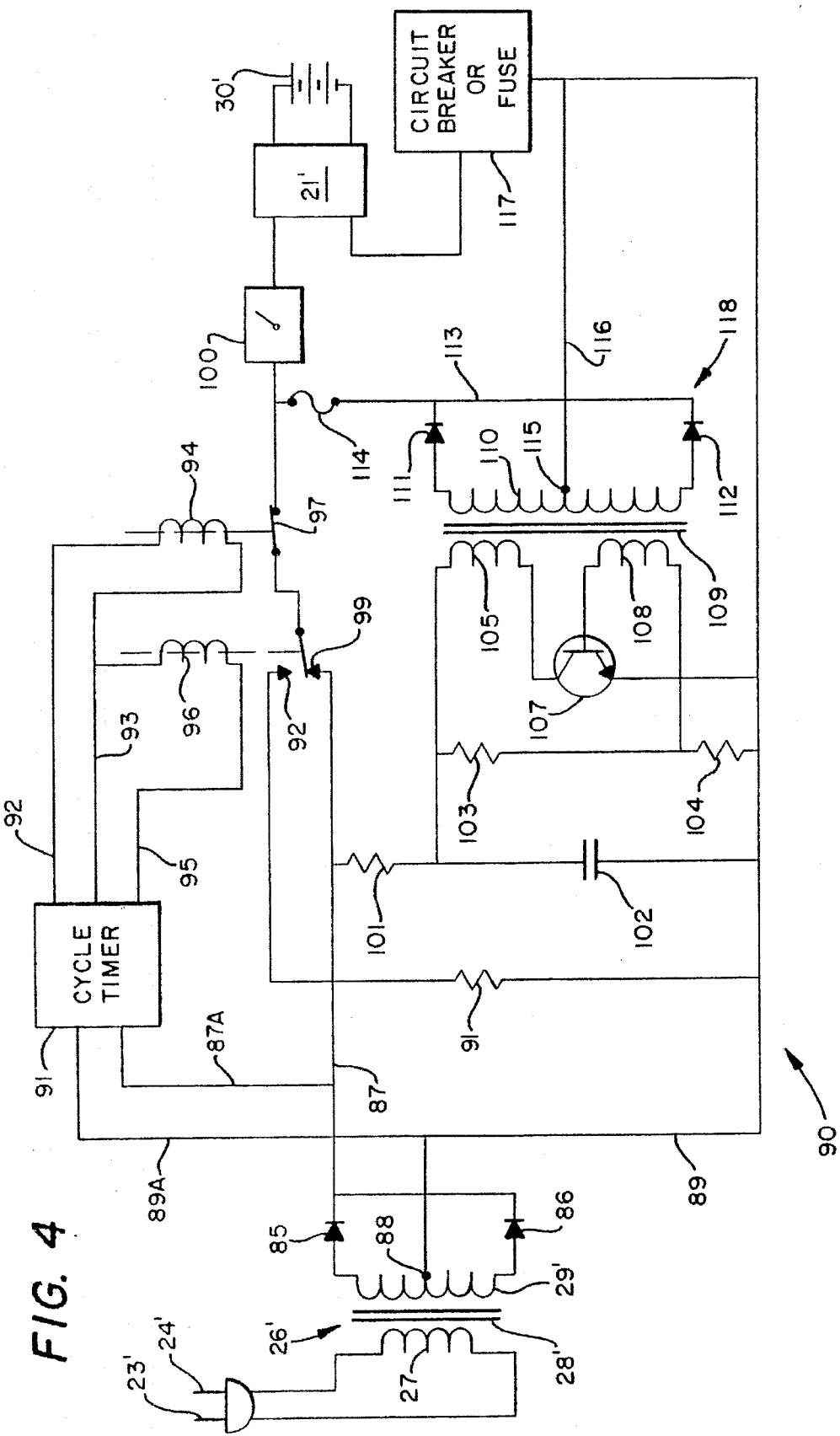
Figure 5:
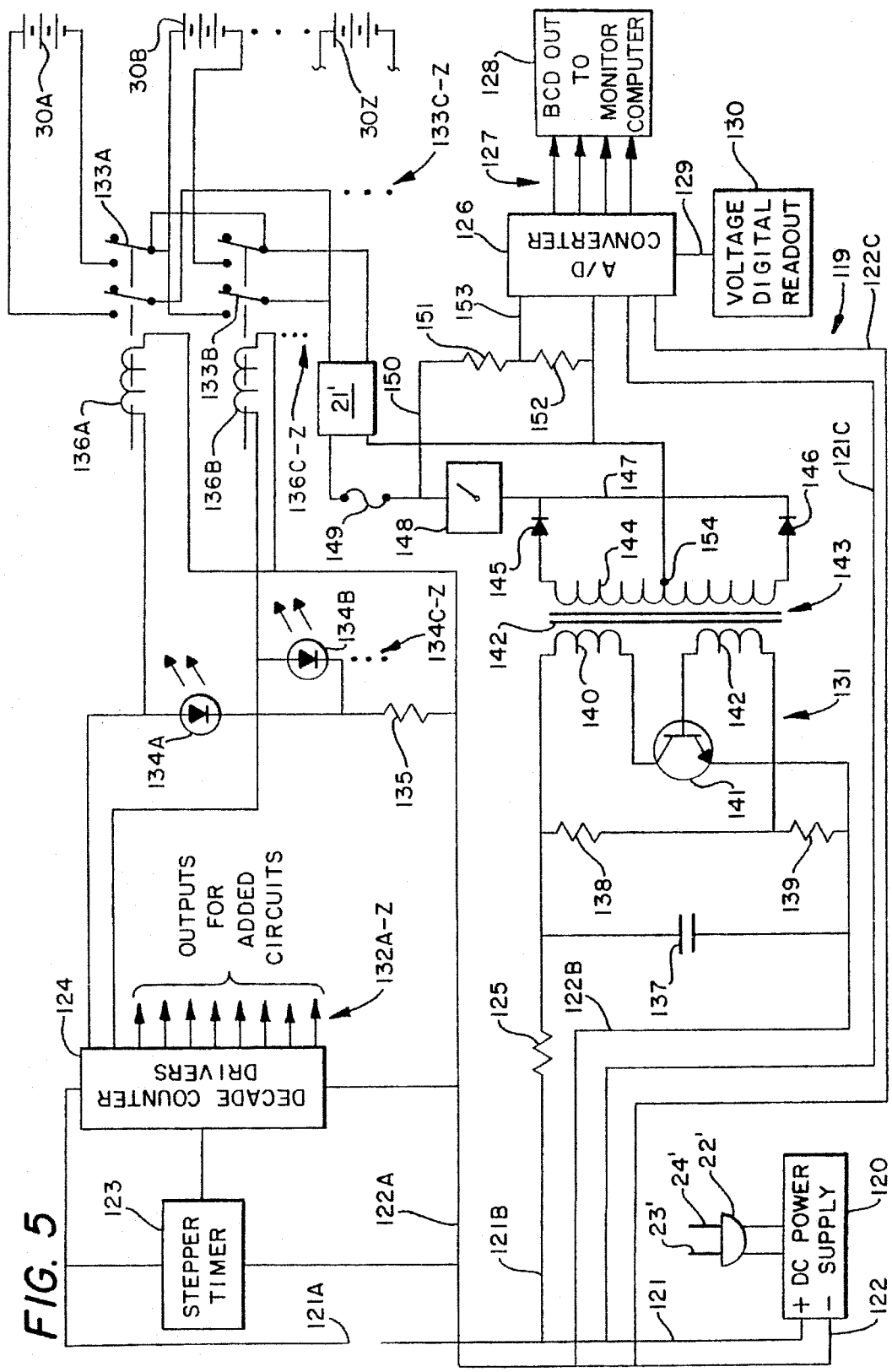

In the drawings:

FIG. 1 represents a block schematic view of a DC power source and battery powered pulse generating circuit output connected through a battery polarity connection adaption solid state switch to a battery being treated;

FIG. 2, a schematic view of a solar radiation powered battery reclaimer and charger unit output connected through a battery polarity connection adaption solid state switch to a battery being treated;

FIG. 3, a schematic view of a voltage source powered reclaimer and charger unit with direct DC charging and a multi-pulse output superimposed thereon output connected through a battery polarity connective adaption solid state switch to a battery being treated;

FIG. 4, a schematic view of an AC input unit with the power transformer input transferred and rectified with relay controlled connection for battery charging and discharging and reclaimer section with a multi-pulse output applied by itself or superimposed on DC charged voltage when relay contacts are closed both output connected through a battery polarity connection adaption solid state switch to a battery being treated; and, FIG. 5, a block schematic view of an AC to DC powered unit with timer controlled relay connection sequentially of a charging and reclaiming circuit unit to a series of batteries output connected through a battery polarity connection adaptive solid state switch to the successive batteries being treated.

Referring to the drawings:

The battery reclaimer and charger unit 10 of FIG. 1 is shown to have a solar cell panel DC power source 11 with positive and negative DC voltage lines 12 and 13 connected as power inputs to pulse generating circuit 14. The two output lines 15 and 16 of the pulse generating circuit 14 are connected, respectively, to the emitters of PNP transistors 17 and 18, and the emitters of NPN transistors 19 and 20 in battery polarity connection adaption solid state switch circuit 21. Switch circuit 21 has two output lines 22 and 23 with connector ends 24 and 25, respectively, line 22 connected to the collector of PNP transistor 17 and NPN transistor 19 and line 23 connected to the collectors of PNP transistor 18 and NPN transistor 20. Line 23 is connected through resistor 28 to the base of PNP transistor 17 and also through resistor 29 to the base of NPN transistor 18. With connection of connectors 24 and 25, connected as shown in FIG. 1, transistors 17 and 20 are biased to conduction establishing interactive connection between battery 30 and the pulse generating circuit 14. Should the connectors 24 and 25 be connected in reverse from the connections shown NPN transistor 19 and PNP transistor 18 are biased to conduction establishing the reverse alternate interactive connection between battery 30 and the pulse generating circuit 14. The battery 30 is in a system that could be a vehicle, automobile or truck, boat or aircraft system, includes a charging unit 31 connected by line 32 to the negative side of the battery 30 and on the other side to the anode of diode 33 cathode connected to the positive line 34 from the positive terminal of battery 30. Line 34 extends to key switch 35, and on the other side switch 35 is connected to the anode of diode 36, through the diode and serially through resistor 37 to power input line 12. The same side of the switch 35 is connected through line 38 to and through battery powered equipment 39 of the vehicle system and on through line 40 back to the battery negative terminal.

It is of interest to note that when key switch 35 is closed battery 30 and/or charging unit 31 is (or are) a power source connected to supply power input to the pulse generating circuit 14 supplemental to, or in place of solar cell panel DC power source 11. Thus, at times, the battery 30 itself is providing the power input to the pulse generating circuit 14 for creating pulse signals interacting with electrolyte, liquid or gel, and related plate deposits in generating ringing signals in the 2 MHz to 10 MHz range effective in regenerating the battery 30.

Referring now to FIG. 2 within a solar unit 10' box enclosure, connection from the solar cell panel 12' solar cells 11A, 11B, 11C and 11D (or more as the case may be) are to single NPN transistor 41 oscillator inverter circuit 42. The positive side of the series connected solar cells 11 is connected through first primary coil 43, of close coupled current transformer 44, to the collector of NPN transistor 41 that has its emitter connected to the negative end of the series connected solar cells 11. The positive side of the series connected solar cells 11, is also connected through capacitor 45 to the negative end of the series connected solar cells 11, and also serially through resistor 46 and second primary coil 47, of the transformer 44, to the base of NPN transistor 41. Further, the junction of resistor 46 and second primary coil 47 is connected through capacitor 48 and resistor 49 in parallel to the negative end of the series connected solar cells 11. It should be noted that transformer 44 in addition to first and second primary coils 43 and 47, respectively, have first and second secondary coils 50 and 51, respectively, and first and second ferrite ceramic core elements 52 and 53, respectively. The center tap 54 between first and second coils 50, and 51 is connected through fuse 55 to the negative terminal of a battery 30' being treated. The outer ends of the first and second secondary coils 50 and 51 are, respectively, connected to the anodes of diodes 57 and 58 and through the diodes to voltmeter 59 and also through resistor 60 to the center tap 54 fuse 55 junction. The other side of voltmeter 59 is connected through to the positive terminal of the battery 30'. It should be noted that the 2 to 10 megahertz RF frequency contributes to the battery plates skin effect of magnetic coupling and enhances the plate cleansing of battery plates of chemical deposits. The single transistor 41 circuit is a relaxation oscillator using close coupled current transformers that impose a fixed current ratio between base current and collector current while also providing the polarity reversal for positive feedback. Secondary windings 50 and 51 provide a current-voltage fullwave pulse output capable of charging, maintaining and reclaiming batteries that possess a liquid or jell electrolyte.

A battery polarity connection adaption solid state switch 21' is included connected to the positive line 15' and to the relatively negative line 16' and has output lines 22 and 23 that can be alternately connected to plus and minus terminals of battery 30'. The polarity of connection determines whether PNP transistor 17 and NPN transistor 20 as one transistor pair or if instead NPN transistor 19 and PNP transistor 18 as a second transistor pair are biased to conduction properly insuring correct polarity as reflected back to input lines 15' and 16'. This helps insure that electrolyte in battery 30', either liquid or gel, De a dynamically active part of the DC powered battery rejuvenator (reclaimer) and charger in generating an RF 2 MHz to 10 MHz signal in the system including the electrolyte.

Referring now to the embodiment of FIG. 3 an AC to DC, or DC, powered reclaimer and charger unit 64 is shown connected for direct DC charging the battery 30' and with the multi-pulse output developed superimosed on the DC battery charging voltage. The positive DC output line 65 is connected to the anode of diode 66 with cathode connected on through line 67 to battery positive terminal clip 15P. Positive DC voltage line 65 is connected serially through resistor 68 and capacitor 69 to negative DC voltage line 70 extended to the battery negative terminal connecting clip 15N. The junction of resistor 68 and capacitor 69 is connected serially through resistors 71 and 72 to negative DC voltage line 70 and also through transformer 73 primary coil 74 to the collector of NPN transistor 75 having its emitter connected through line 76N to the negative DC voltage line 70. The junction of resistors 71 and 72 is connected serially through transformer 73 transistor biasing coil 76 and line 77 to the base of NPN transistor 75. Pulse signaling as generated at the collector of NPN transistor 75 is conveyed to transformer primary coil 74 and through the transformer 73, equipped with a single ferrite ceramic core element 78 for fast signal transfer, to transformer secondary coils 76 and 79. Transformer secondary coil 79 has a center tap connection through line 80 to the negative DC voltage line 70 and opposite ends are connected to the anodes of diodes 81 and 82 and through these diodes acting to rectify the signal from coil 79 to a fast rise time positive DC voltage pulse waveform fed to and through meter 83 and fuse 84 to line 67 as a pulse waveform superimposed on line 67 DC voltage levels applied to battery 30'. A battery polarity connection adaptive solid state switch 21' is inserted in lines 67 and 70, in line 67 between the fuse 84 connection and the positive battery 30' terminal connector 15P and in line 70 between tap line 80 and the relatively negative battery 21' terminal connector 15N.

Referring now to FIG. 4 a two prong 23' and 24' socket 22' is used for feeding AC to transformer 26' having primary coil 27' and secondary coil 29' separated with a ferrite ceramic core element 28' therebetween. Opposite ends of secondary coil 29' are connected to the anodes of diodes 85 and 86 for rectifying a positive DC to positive line 87 relative to negative DC being fed from coil center tap 88 to negative line 89 in a battery charging and discharging reclaimer embodiment 90. Line branch 87A from positive line 87 and line branch 89A from negative line 89 extend to cycle timer 91. Timer 91 output lines 92 and 93 extend to relay coil 94 and lines 93 and 95 are connected to relay coil 96 in order that relay switches 97 and 98 be switched in cyclic manner as controlled by cycle timer 91. Positive line 87 is connected to switch contact 99 of switch 98 and in the state shown passes positive DC on through closed switch 97 to and through current meter 100 to the positive terminal of battery 30' as a charging current. Negative DC line 89 is connected through resistor 91 to switch contact 92 of the double pole single throw relay switch 98 that when closed with switch 97 also closed serves to discharge battery 30'. Positive DC line 87 is connected through resistor 101 and, serially, capacitor 102 to negative DC line 89. The junction of resistor 101 and capacitor 102 is connected serially through resistors 103 and 104 to negative DC line 89 and also through first primary coil 105 of transformer 106 to the collector of NPN transistor 107 having an emitter connection to negative DC line 89. The junction of resistors 103 and 104 is connected through the second primary coil 108 of transformer 106 to the base of NPN transistor 107. A ferrite ceramic core element 109 separates secondary coil 110 from first and second primary coils 105 and 108. Opposite ends of secondary coil 110 are connected to the anodes, respectfully, of diodes 111 and 112 having cathodes connected via line 113 through fuse 114 to positive DC line extension 87B out of relay switches 97 and 98 through current meter 100 to the positive terminal of battery 30'. Center tap 115 of secondary coil 110 is connected through line 116 to the negative DC voltage line 89 that is connected through a circuit breaker or fuse 117 to the negative terminal of battery 30'. This is another embodiment for cleaning battery plates of chemical deposits. The cycle timer 91 is adjusted to cycle charge and discharge time generally equally over a twenty four hour period as controlled by relay switch 98 for a number of cycles and then at the end of the period of cycles relay switch 97 is opened to leave only the pulses generated by the vibrator circuit 118 being applied to the battery 30' to generate high frequency ringing in the circuit within each pulse structure. Resistor 91 would generally be about one ohm for discharging battery 30', however, for small batteries that resistance value would be increased.

A battery polarity connection adaption solid state switch 21', the same as in FIGS. 2 and 3, is inserted between meter 127 and the positive terminal of battery 30' and between the circuit breaker, or fuse, 144 and the negative terminal of battery 30'.

Referring to the AC to DC powered unit 119 of FIG. 5, a two prong 23' and 24' socket 22 is used for feeding AC to AC to DC power supply 120 having a positive DC output line 121 and a negative DC output line 122. The positive DC line 121 has a branch line 121A connected to step timer 123 and to decade counter drivers circuit 124, a branch line 121B connected to resistor 125 and a branch line 121C connected to A/D converter circuit 126. A/D converter circuit 126 has multiple outputs 127 to BCD out to monitor circuit 128, for informational purposes, and also an output line 129 connection to voltage digital readout circuit 130. The negative DC line 122 has a branch line 122A connected to stepper timer 123 and to decade counted drivers circuit 124, a branch line 122B connected to the blocking oscillator circuit 131 and a branch line 122C connected to A/D converter circuit 126. Decade counter drivers circuit 124 has a plurality of output lines 132A–Z connected in like manner to individual relay switches 133A–Z for batteries 30A–Z, Each of lines 132A–Z has a connection to the anode of a light emitting diode 134A–Z the cathodes of which are connected in common to and through resistor 135 to negative DC branch line 122A. Negative DC branch line 122A is also connected to the relay switch coils 136A–Z. Resistor 125 is connected through capacitor 137 to the negative DC line 122, serially through resistors 138 and 139 to the negative DC line 122 and through first primary transformer coil 140 to the collector of NPN transistor 141. The junction of resistors 138 and 139 is connected through second primary transformer coil 142 to the base of NPN transistor 141 and the emitter thereof is also connected to the negative DC line 122. A ferrite ceramic core element 142 in transformer 143 separates secondary coil 144 from first and second primary coils 140 and 142. Opposite ends of transformer secondary cell 144 are connected to the anodes of diodes 145 and 146 the cathodes of which are connected through signal pulse output line 147 through current meter 148 and thorough fuse 149 to normally open contacts of relay switches 133A–Z that are connected to the positive terminals of batteries 30A–Z. The output of current meter 148 is connected through line 150 to and through, serially, resistors 151 and 152 to the center tap of transformer secondary coil 144 that along with the junction line 153 of resistors 151 and 152 is connected as an input to A/D converter circuit 126. Transformer secondary coil center tap 154 is also connected to normally open contacts of relay switches 133A–Z that are connected to the negative terminals of batteries 30A–Z such that individual selected batteries 30A–Z may be relay switch 133A–Z connected for pulse activated RF ringing frequency treating as desired. This embodiment is particularly useful for keeping battery plates cleaned on groups of batteries in use or setting on a shelf.

A battery polarity connection adaption solid state switch 21', the same as in FIGS. 2, 3 and 4, is inserted in the circuit path from fuse 149 to the relay switches 133A–Z and in the circuit path from coil center tap 152 to the relay switches 133A–Z.

Please note that in place of the NPN and PNP transistor battery polarity connection adaption solid state switch with various battery reclaimer and charger circuit embodiments, comparable working switch circuits may be provided. These would include, field (FET) devices, silicone controlled rectifiers, metal (MOS) devices, and unijunction (UJT) devices, and possibly various mixtures of such devices and even along with NPN or PNP transistors in combination. This applies as well to the various pulse generating circuits used.

Whereas this invention has been described with respect to a preferred embodiment thereof, it should be realized that various changes may be made without departure from the essential contributions to the art made by the teachings hereof.

I claim:

1. A DC powered battery reclaimer and charger including a battery connection electronic polarity adaption switch comprising: pulse generator means having DC power input means and two output lines a first positive pulse signal output line and a second relatively negative line; a first battery terminal connective means and second battery terminal connective means; battery polarity connection adaption solid state switch means connected between said two output lines on one side and said first and said second battery terminal connective means; said battery polarity connection adaption solid state switch means including two through conductive circuits each having at least two voltage bias to conduction solid state devices with biasing to conduction means alternately biased to conduction dependent on the polarity of connection to a battery of said first and second battery terminal connective means eliminating any requirement for one to have to make a mechanical switch decision as to the polarity of the battery terminals.

2. The battery connection electronic polarity adaption switch with a DC powered battery reclaimer and charger of claim 1, wherein said battery polarity connection adaption solid state switch means includes, two PNP transistors and two NPN transistors; emitters of said PNP transistors are connected to said first positive pulse signal output line, and emitters of said NPN transistors are connected to said second relatively negative line; said first battery terminal connective means connected to the collectors of the first of said two NPN transistors and of a first of said two PNP transistors; said second battery terminal connective means connected to the collectors of the second of said two NPN transistors and a second of said two PNP transistors; first resistor bias means connected from said first battery terminal connective means to the base of said second NPN transistor, and second resistor bias means connected from said second battery terminal connective means to the base of said first PNP transistor as a first of said biasing to conduction means; third resistor bias means connected from said first battery terminal connective means to the base of said second PNP transistor, and second resistor bias means connected from said second battery terminal connective means to the base of said first NPN transistor as a second of said biasing to conduction means automatically adjusting the circuit output terminals to the polarity of the battery they are connected to without requiring any visual polarity indicating device and testing device.

3. The battery connection electronics polarity adaption switch with a DC powered battery reclaimer and charger of claim 1, wherein a charging unit and first uni-directional current flow means in series are connected across the terminals of a battery in parallel with said first battery terminal connective means and said second battery terminal connective means.

4. The battery connection electronic polarity adaption switch with a DC powered battery reclaimer and charger of claim 1, wherein key switch means and battery powered equipment are connected in series across the terminals of a battery in parallel with said first battery terminal connective means and said second battery terminal connective means.

5. The battery connection electronic polarity adaption switch with a DC powered battery reclaimer and charger of claim 4, wherein said key switch means closes a circuit from a battery terminal through a second uni-directional current flow means, and on through a resistor to an input to said pulse generating circuit for supplying power to said pulse generating circuit.

6. The battery connection electronic polarity adaption switch with a DC powered battery reclaimer and charger of claim 5, wherein a charging unit and first uni-direction current flow means connected in series are connected across the terminals of a battery in parallel with said first battery terminal connective means and said second battery terminal connective means.

7. The battery connection electronic polarity adaption switch with a DC powered battery reclaimer and charger of claim 1, wherein DC from a DC power source is two line means connected to and through said battery polarity connection adaption solid state switch means to said first battery terminal connective means, and to said second battery terminal connective means.

8. The battery connection electronic polarity adaption switch with a DC powered battery reclaimer and charger of claim 7, wherein one of the two lines of said two line means includes a uni-directional current means; and with said pulse generator means two output lines being connected, respectively, to said two line means.

9. The battery connection electronic polarity adaption switch with a DC powered battery reclaimer and charger of claim 1, wherein a charging unit is connected across the terminals of a battery in parallel with said first battery terminal connective means and said second battery terminal connective means; said charging unit is connectable by first positive DC circuit path means, and by second relatively negative DC circuit path means; and first relay switch means positioned in said first positive DC circuit path before connection thereto of said battery polarity connection adaption solid state switch means.

10. The battery connection electronic polarity adaption switch with a DC powered battery reclaimer and charger of claim 9, wherein second relay switch means is positioned in first said positive positive DC circuit path; cycle timer means with power DC input connection from said charging unit; a first output circuit to relay coil for said first relay switch means from said cycle timer means, and a second output circuit to relay coil for said second relay switch.

11. The battery connection electronic polarity adaption switch with a DC powered battery reclaimer and charger of claim 10, wherein said relay switch includes a double throw two contact switch with a first contact in said first positive DC circuit path means, and the second contact connected through a resistor to said second relatively negative DC circuit path.

12. The battery connection electronic polarity adaption switch with a DC powered battery reclaimer and charger of claim 10, wherein said charging unit is an AC input to rectified DC output power supply.

13. The battery polarity connection adaption switch with a DC powered battery reclaimer and charger of claim 1, wherein a plurality of relay switches are connected to at least one of said first battery terminal connective means and said second battery terminal connective means as a part thereof; and each of said plurality of relay switches circuit connectable to an individual battery of a like plurality of batteries.

14. The battery connection electronic polarity adaption switch with a DC powered battery reclaimer and charger of claim 13, wherein timing means is connected to individually successively activate individual relay switches for closing the output circuit to one battery one at a time.

15. The battery connection electronic polarity adaption switch with a DC powered battery reclaimer and charger of claim 14, wherein said timing means includes a stepping timer and a decade counter drivers circuit both connected to said DC power input means.

\* \* \* \* \*